Jan. 9, 1968  J. L. LAVOIE  3,362,165

MULTI-STAGE SOLID PROPELLANT ROCKET MOTOR

Filed Sept. 2, 1966

INVENTOR.
JOHN L. LAVOIE
BY Edwin D. Grant

ATTORNEY

United States Patent Office 3,362,165
Patented Jan. 9, 1968

3,362,165
MULTI-STAGE SOLID PROPELLANT
ROCKET MOTOR
John L. Lavoie, Ogden, Utah, assignor to Thiokol Chemical Corp., Bristol, Pa., a corporation of Delaware
Filed Sept. 2, 1966, Ser. No. 576,932
1 Claim. (Cl. 60—225)

This invention relates to rocket motors and, more particularly, to multi-stage solid propellant rocket motors having minimal weight and size.

Heretofore multi-stage operation of solid propellant rocket motors has been achieved by arranging a plurality of such rocket motors in clusters or in tandem. The payload that can be carried by such multi-stage rocket motors is obviously reduced by the weight of the braces or interstage structures required for connecting the separate rocket motor casings together. Furthermore, multi-stage rockets formed of a plurality of solid propellant rocket motors are too bulky to be used for certain rocket applications.

It is accordingly a broad object of this invention to provide an improved multi-stage solid propellant rocket motor.

Another object of the invention is to provide a multi-stage solid propellant rocket motor having minimal weight and size.

An additional object of the invention is to provide a rocket motor the construction of which can readily be varied to provide a different number of thrust stages for the rocket motor.

These and other objects of the present invention are achieved by rocket motors each of which comprises two or more thrust nozzles coaxially disposed within a casing and joined thereto at or near their exit diameter, at least portions of these thrust nozzles being arranged one inside another so as to provide annular spaces therebetween each of which is at least partially filled with a solid propellant grain. The invention will be more readily understood by consideration of the following description of several embodiments thereof, in which description reference is made to the accompanying drawings wherein:

Throughout the specification and drawings like reference numbers designate like parts.

Figure 1:
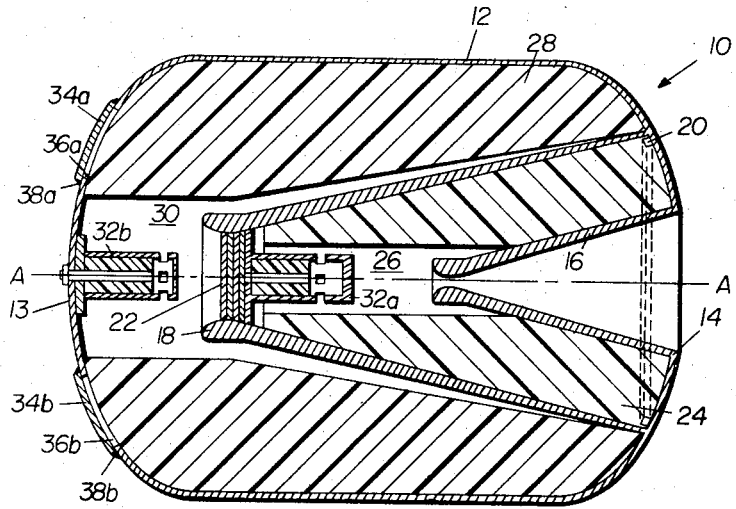
FIGURE 1 is a sectional view taken along the longitudinal axis of a preferred embodiment of the invention.

In FIGURE 1 the number 10 generally designates a rocket motor comprising a substantially cylindrical casing 12 the forward end of which is closed by an end closure 13 and the aft end of which is formed with an aperture 14. A thrust nozzle 16 is fixedly joined to casing 12 and extends forward from aperture 14 therein. The aft portion of a second thrust nozzle 18 is concentrically positioned around thrust nozzle 16 with its aft edge fixedly joined to casing 12 and its forward end disposed forward of the forward end of the smaller thrust nozzle. Thus thrust nozzles 16 and 18 have a common longitudinal axis designated in the drawing by the letter A. Although in the embodiment of the invention herein described thrust nozzle 18 is larger than thrust nozzle 16, in other embodiments of the invention thrust nozzles of the same size can be employed, the only requirement being that a portion of at least one thrust nozzle be disposed around a thrust nozzle aft thereof so as to provide an annular space therebetween. Furthermore, thrust nozzles of a rocket motor in accordance with the invention can also decrease in size in a forward direction (i.e., the aft end of a thrust nozzle can be disposed around the forward end of a larger thrust nozzle to provide an annular space therebetween).

Disposed against the inner surface of casing 12 and adjacent the inner surface (i.e., the surface facing thrust nozzle 16) of thrust nozzle 18 is an annular shaped charge 20, this charge being connected to means (not illustrated) for igniting the charge at any selected time. A heat-resistant barrier 22 is removably mounted within the throat of thrust nozzle 18, and a first solid propellant grain 24 is disposed between said thrust nozzle 18 and thrust nozzle 16 as illustrated in the drawing. More particularly, the inner surface of the aft portion of grain 24 is bonded to the outer surface of thrust nozzle 16, the aft end surface of said grain is bonded to the inner surface of casing 12, the outer surface of said grain is bonded to the inner surface of thrust nozzle 18, and the forward end surface of said grain is spaced from barrier 22. Furthermore, grain 24 is formed with a perforation 26 that extends from the outer surface of the forward portion of thrust nozzle 16 to the forward end surface of said grain.

A second solid propellant grain 28 is disposed between the outer surface of thrust nozzle 18 and the inner surface of casing 12. More particularly, the periphery of grain 28 is bonded to the inner surface of casing 12, and the grain is formed with a perforation 30 that extends from the aft end of thrust nozzle 18 to the end closure 13 of said casing. Rocket motor 10 is also provided with two igniters 32a, 32b mounted on barrier 22 and end closure 13 respectively, with two covers 34a, 34b respectively mounted on said end closure 13 over two ports 36a, 36b, and with two annular shaped charges 38a, 38b disposed around said covers 34a, 34b and connected to means (not illustrated) adapted to ignite the charges at any selected time.

It will be recognized by persons skilled in the art of rocket motors that the components of rocket motor 10 may be selected from many well-known materials. For example, casing 12 may be made of high-strength steel coated on its inner surface with a suitable insulation and bonding material (not illustrated), thrust nozzles 16 and 18 may be formed of heat-resistant metals or plastic laminates, and barrier 22 may also be formed of a plastic laminate. The compositions of solid propellant grains 24, 28 may be selected for the particular application of rocket motor 10 and are not limited to any particular one of the many solid propellants known in the art. Igniters 32a, 32b may be of conventional design.

Ignition of grain 24 can be effected at any time by means of igniter 32a, after which time the gas generated by combustion of the grain passes through thrust nozzle 16 and propels the rocket motor and any payload connected thereto. During this stage of the operation of rocket motor 10 the barrier 22 in the throat of thrust nozzle 18 prevents the ignition of grain 28. After grain 24 has been consumed (or prior to the burn-out of said grain if it is desired to terminate the thrust of rocket motor 10 during its first stage operation), the shaped charge 20 can be ignited to separate the portion of casing 10 between the ends of thrust nozzles 16 and 18 from the remainder of said casing, thus also removing thrust nozzle 16 from the exit cone of thrust nozzle 18 and readying the latter for use. Thereafter igniter 32b can be fired at any selected time to ignite grain 28, whereupon the gas generated by combustion of this grain expels barrier 22 from the thrust nozzle 18 and propels the rocket motor and any payload attached thereto. At any time during the combustion of grain 28 the shaped charges 38a, 38b can be ignited to remove covers 34a, 34b from casing 12, thus opening ports 36a, 36b and terminating the thrust of the second stage of rocket motor 10.

The above-described embodiment of the present invention permits the use of a two stage propulsion system within a length limited installation and also permits thrust termination of both stages at any desired time. The thrust nozzles 16 and 18 are a part of the pressure vessel structure for the two stages of the rocket motor 10, eliminating the weight of separate casings and interconnecting structure employed in conventional multi-stage solid propellant rocket motors and providing a low inert weight to propellant weight ratio for the rocket motor 10. An additional advantage of a multi-stage rocket in accordance with the invention is that its center of gravity shifts less, during operation of the stages thereof, than the center of gravity of conventional multi-stage solid propellant rocket motors, which is desirable from the standpoint of aerodynamic and flight control considerations.

Figure 2:
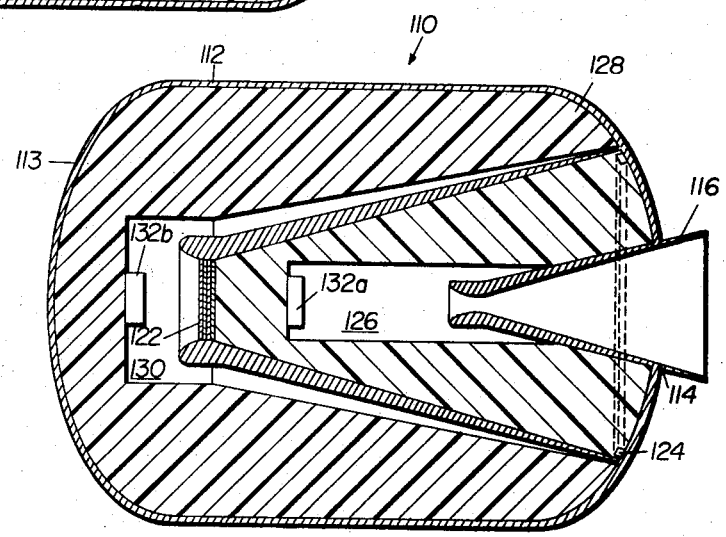
FIGURE 2 is a sectional view taken along the longitudinal axis of a second embodiment of the invention.
Figure 3:
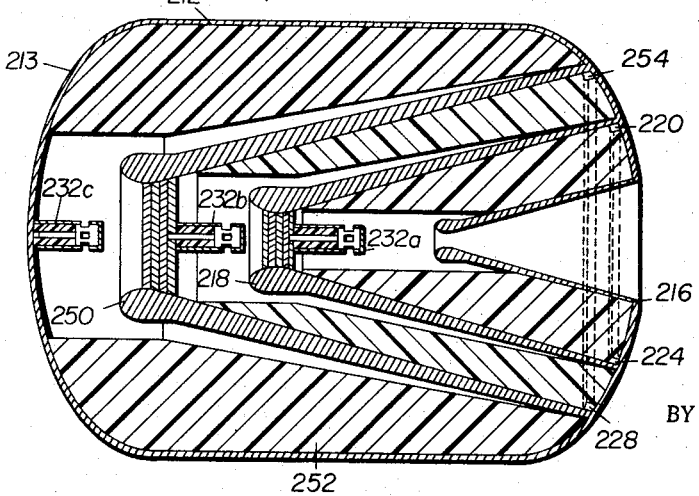
FIGURE 3 is a sectional view taken along the longitudinal axis of a third embodiment of the invention.

The utility of the invention is not limited to the embodiment thereof illustrated in FIGURE 1. In FIGURE 2 is illustrated a second rocket motor 110 that is similar to the embodiment of FIGURE 1 but differs therefrom in having the smaller thrust nozzle 116 of the rocket motor 110 only partially enclosed within the casing 112 of the rocket motor. However, as in the construction of the embodiment of the invention illustrated in FIGURE 1, the periphery of thrust nozzle 116 is joined to casing 112 at the edge of the aperture 114 therein and the thrust nozzle extends forward from said edge to provide a part of the pressure vessel for the first stage of the rocket motor. Also the perforations 126 and 130 of grains 124 and 128 respectively do not extend completely through the grains as do the perforations 26 and 30 in grains 24 and 28 of rocket motor 10. It will be evident, however, that the manner of operation of rocket motor 110 is the same as that of rocket motor 10. In FIGURE 3 is illustrated a rocket motor 210 that is provided with three thrust nozzles 216, 218 and 250, three solid propellant grains 224, 228 and 252, and three igniters 232a, 232b and 232c for igniting said grains. An annular shaped charge 220 permits the separation of thrust nozzle 216 and the portion of casing 212 between said thrust nozzle and the aft end of thrust nozzle 218 from the remainder of casing 212, and an annular shaped charge 254 permits the separation of thrust nozzle 218 and the portion of casing 212 between said thrust nozzle and the aft end of thrust nozzle 250 from the remainder of casing 212. It will thus be understood from the description of the operation of the first-described embodiment of the invetnion that rocket motor 210 provides for three-stage operation of a solid propellant rocket motor in an easily constructed and compact assembly. Other solid propellant rocket motors having more than three stages can readily be constructed in accordance with the principles of the invention.

Hence, although specific embodiments of the invention have been illustrated and described, they are illustrative only and are not to be construed as limiting the scope of the invention, which is set forth in the appended claim.

What is claimed is:

1. A multi-stage solid propellant rocket motor comprising:
   a casing having an aperture formed in the aft end thereof;
   at least two thrust nozzles substantially coaxially disposed within said casing, the periphery of a first one of said thrust nozzles being joined to said casing and extending forward from the edge of said aperture therein, at least a portion of the second one of said thrust nozzles being positioned around said first thrust nozzle to provide an annular space therebetween, the aft end of said second thrust nozzle being joined to said casing and its forward end being disposed forward of the forward end of said first thrust nozzle;
   a heat-resistant barrier removably mounted within the forward end of said second thrust nozzle;
   a first solid propellant grain disposed between said thrust nozzles;
   a second solid propellant grain disposed between said second thrust nozzle and said casing;
   means for igniting said first and second grains at selected times; and means for separating the portion of said casing between said thrust nozzles from the remainder of said casing at a selected time.

No references cited.

CARLTON R. CROYLE, *Primary Examiner.*